United States Patent
Kennerly et al.

(10) Patent No.: US 10,692,029 B2
(45) Date of Patent: Jun. 23, 2020

(54) SYSTEM AND METHOD FOR MULTIPLE TIMER MANAGEMENT TASK FOR ENHANCED COGNITION

(71) Applicant: LUMOS LABS, INC., San Francisco, CA (US)

(72) Inventors: David Ethan Kennerly, San Francisco, CA (US); Benjamin Lee Ahroni, San Francisco, CA (US); Aaron Kaluszka, Hayward, CA (US); Joseph Lee Hardy, El Cerrito, CA (US)

(73) Assignee: LUMOS LABS, INC., San Francisco, CA (US)

( * ) Notice: Subject to any disclaimer, the term of this patent is extended or adjusted under 35 U.S.C. 154(b) by 0 days.

(21) Appl. No.: 15/859,920

(22) Filed: Jan. 2, 2018

(65) Prior Publication Data

US 2018/0293529 A1    Oct. 11, 2018

Related U.S. Application Data

(63) Continuation of application No. 14/668,182, filed on Mar. 25, 2015, now abandoned.
(Continued)

(51) Int. Cl.
*G06Q 10/00* (2012.01)
*G06Q 10/06* (2012.01)
(Continued)

(52) U.S. Cl.
CPC ..... *G06Q 10/06316* (2013.01); *G09B 19/003* (2013.01); *G09B 19/24* (2013.01)

(58) Field of Classification Search
CPC . G06Q 10/06316; G09B 19/24; G09B 19/003
See application file for complete search history.

(56) References Cited

U.S. PATENT DOCUMENTS 5,687,291 A * 11/1997 Smyth ............... G06N 3/049
                                                        600/544
5,755,576 A *  5/1998 Dunn ................. A61B 5/162
                                                        273/454
(Continued)

FOREIGN PATENT DOCUMENTS

KR      1020080038244      5/2008
KR       101000867 B1     12/2010
(Continued)

OTHER PUBLICATIONS

"Cold Stone Creamery: Scoop It Up So You Don't Have To", Jan. 7, 2010, kotaku.com, Fahey Mike, p. 1. (Year: 2010).*
(Continued)

*Primary Examiner* — Jonathan G Sterrett
(74) *Attorney, Agent, or Firm* — Buchalter; Cecily Anne O'Regan

(57) ABSTRACT

Disclosed are cognitive training exercises that are designed to target an ability of a user to track multiple ongoing streams of information concurrently and to correctly and efficiently perform one or more actions related to these streams to achieve an end goal are described herein. The training exercises use, as an exemplar metaphor, a theme of a barista working in a coffee shop, bar or establishment. The user assumes the role of the barista, for example, taking orders for various types of drinks that might be purchased at a coffee shop. The user then needs to manage the production of these orders to perform well within an optimal time period. The system is configurable to increase the challenge presented to a user in response to prior performance by, for example, adding additional orders, adding additional machines for producing beverages, adding additional beverage types available for order. The system is also configurable to dynamically increase the difficulty of the challenge in response to one or more of a user's performance, a
(Continued)

passage of time, or any other variable that is desirable. In addition, the system is configurable to enable the user to flip between screens presented and/or to switch between orders and machines viewable by the user at a given time resulting in an increased memory requirement for the user.

19 Claims, 12 Drawing Sheets

Related U.S. Application Data

(60) Provisional application No. 61/970,755, filed on Mar. 26, 2014.

(51) Int. Cl.
*G09B 19/00* (2006.01)
*G09B 19/24* (2006.01)

(56) References Cited

U.S. PATENT DOCUMENTS

| | | | |
|---|---|---|---|
| 6,216,098 B1* | 4/2001 | Clancey | G06Q 10/10 703/6 |
| 6,431,547 B1 | 8/2002 | Arkoosh et al. | |
| 7,536,287 B2* | 5/2009 | Chussil | G06N 3/004 703/16 |
| 7,540,615 B2 | 6/2009 | Merzenich et al. | |
| 7,773,097 B2 | 8/2010 | Merzenich et al. | |
| 8,154,227 B1 | 4/2012 | Young et al. | |
| 2003/0167454 A1* | 9/2003 | Iordanov | G09B 23/28 717/104 |
| 2004/0202309 A1* | 10/2004 | Baggenstoss | G06Q 10/06 379/265.06 |
| 2005/0004789 A1* | 1/2005 | Summers | G06Q 10/10 703/22 |
| 2005/0053904 A1 | 3/2005 | Shephard et al. | |
| 2005/0056999 A1 | 3/2005 | Roemer et al. | |
| 2005/0216243 A1* | 9/2005 | Graham | G06F 19/3437 703/11 |
| 2006/0003298 A1 | 1/2006 | Greenspan | |
| 2006/0072739 A1* | 4/2006 | Baggenstoss | H04M 3/5233 379/265.05 |
| 2006/0292531 A1 | 12/2006 | Gibson | |
| 2007/0031798 A1 | 2/2007 | Gottfried | |
| 2007/0060231 A1 | 3/2007 | Neveu et al. | |
| 2007/0166675 A1 | 7/2007 | Atkins et al. | |
| 2008/0003553 A1 | 1/2008 | Stark et al. | |
| 2008/0084427 A1 | 4/2008 | Delahunt et al. | |
| 2010/0041001 A1 | 2/2010 | Delahunt et al. | |
| 2011/0028202 A1 | 2/2011 | Naicker et al. | |
| 2011/0097697 A1 | 4/2011 | Tharanathan et al. | |
| 2013/0101975 A1 | 4/2013 | Hardy et al. | |
| 2015/0093730 A1 | 4/2015 | Kennerly et al. | |
| 2017/0055752 A1* | 3/2017 | Mueller | G06Q 30/0621 |

FOREIGN PATENT DOCUMENTS

| | | |
|---|---|---|
| WO | 2009067796 A1 | 6/2009 |
| WO | 2012064999 A1 | 5/2012 |
| WO | 2013043781 A2 | 3/2013 |
| WO | 2013180845 A1 | 12/2013 |
| WO | 20140179278 A1 | 11/2014 |
| WO | 2015095488 A1 | 6/2015 |

OTHER PUBLICATIONS

"Designing a Game Based on Monopoly as a Learning Tool for Lodging Development", Robert O'Halloran & Cynthia Deale, Journal of Hospitality & Tourism Education, vol. 22, No. 3, Published online: May 29, 2013, pp. 35-48 (Year: 2013).*

"Persuasive Games Stone City—Cold Stone Creamery, Inc.", copyright 2005 Cold Stone Creamery, retrieved from the web at http://persuasivegames.com/games/game.aspx?game=coldstone (Year: 2005).*
Persuasive Game's "Coldstone Creamery", Mar. 17, 2006, retrieved from http://web.archive.org/web/20060317235436/http://persuasivegames.com/games/game.aspx?game=coldstone (Year: 2006).*
"Enumeration versus multiple object tracking: The case of action video game players", CS Green, D Bavelier—Cognition, 2006—Elsevier (Year: 2006).*
Gaming improves multitasking skills A Abbott—Nature News, 2013—nature.com (Year: 2013).*
"Cold Stone Creamery: Scoop It Up So You Don't Have To", Jan. 7, 2010, kokatu.com, Fahey Mike, p. 1.
"Designing a Game Based on Monopoly as a Learning Tool for Lodging Development", Robert O'Halloran & Cynthia Deale, Journal of Hospitality & Tourism Education, vol. 22, No. 3, Published online: May 29, 2013, pp. 35-48.
"Persuasive Games Stone City—Cold Stone Creamery, Inc.", copyright 2005 Cold Stone Creamery, retrieved from the web at http://persuasivegames.com/game.aspx?game=coldstone.
Benkos, et al. "Short-term training in the Go/Nogo task: behavioural and neural changes depend on task demands". Int J Psychophysiol. 87 (3): 301-312 (2013), pp. 1-42.
Czerwinski, M., et al., Automatization and Training in Visual Search, Amer. J. Psychol. 105, 271-315 (1992).
Daneman, et al. "Individual differences in working memory and reading. Journal of Verbal Learning and Verbal Behavior" 19(4): 450-466. doi:10.1016/S0022-5371(80)90312-6 (1980).
Das et al., "Cognitive planning: The psychological basis of intelligent behavior" Abstract, Psyccritiques 42(7), Sage Publications (1996).
Donner, et al., "Involvement of the human frontal eye field and multiple parietal areas in covert visual selection during conjunction search," European Journal of Neuroscience 12(9) 3407-3414 (2001).
Duncan, et al. Visual Search and Stimulus Similarity. Abstract. Psychological Review 96(3) 4533-458 (1989).
Ekstrom, et al. "Manual for Kit of Factor-Referenced Cognitive Tests," pp. 173-179. Princeton NJ: Educational Testing Service (1976).
Ho, et al., Age, Skill Transfer, and Conjunction Search. Journal of Gerontology 57B(3) 277-287 (2002).
Ho, et al., Plasticity of Feature-Based Selection in Triple-Conjunction Search, Abstract. Canadian Journal of Experimental Psychology 57(1) 48-60 (2003).
Houben, et al. "Resisting temptation: Decreasing alcohol-related affect and drinking behavior by training response inhibition" Abstract. Drug and Alcohol Dependence, 116(1), 132-136 (2011).
Ira, "Track my train app review" Top Apps http://www.topapps.net/blackberry/track-my-train-app-review.html (Feb. 26, 2013).
Jaeggi, et al., "Improving fluid intelligence with training on working memory" Proc. Nat'l Acad. Sci., 105(19):6829-6833 (2008).
Ji et al., "Design and implementation of cognitive enhancement games for rehabilitation of old mans" Korea Info. Sci. Soc. J. 14: 239-246 (2008)—English Abstract.
Kane, et al. "The role of prefrontal cortex in working-memory capacity, executive attention, and general fluid intelligence: An individual-differences perspective" Psychonomic Bulletin & Review 9(4), 637-671. doi:10.3758/BF03196323 (2002).
Levitt, "Transformed Up-Down Methods in Psychoacoustics" J. Acoustical. Soc of Am. 49(2) 467-77 (1970).
Lobley, et al., Perceptual learning in visual conjunction search. Abstract. Perception 27 1245-1255 (1998).
Lumos Labs, Addition Storm.
Manuel, et al. "Brain Dynamics Underlying Training-Induced Improvement in Suppressing Inappropriate Action". J Neuroscience. 30(41): 13670-13678 (2010).
Matzen, et al. "Recreating Raven's Software for Systematically generating large numbers of Ravin-like matrix problems with normed properties," Behavior Research Methods 42(2):525-541 (2010).
Muller, et al., The functional neuroanatomy of visual conjunction search: a parametric fMRI study. NeuroImage 20, 1578-1590 (2003).

(56) References Cited

OTHER PUBLICATIONS

Nosek, et al., "The go/no-go association task" Social Cognition 19(6):625-666 (2001).

Papaioannidis, "Clockwork Brain—The best iPad and iPhone Puzzle game is now available!", AppleCasts (Feb. 20, 2012) (http://www.applecasts.com/clockwork-brain-best-iphone-puzzle-game/).

Parragh et al., "A survey on pickup and delivery problems Part I: Transportation between customers and depot", Institut fur Betriebswirtschaftslehre (Institute of Business Administration), University of Vienna, Feb. 19, 2008, pp. 1-28, Vienna, Austria.

Parragh et al., "A survey on pickup and delivery problems Part II: Transportation between pickup and delivery locations", Institut fur Betriebswirtschaftslehre (Institute of Business Administration), University of Vienna, Apr. 16, 2008, pp. 1-35, Vienna, Austria.

Ponds, et al., "Age differences in divided attention in a simulated driving task." Abstract. J. Gerontology 43 (6):151-156 (1988).

Rajender et al., "Efficacy of cognitive retraining techniques in children with attention deficit hyperactivity disorder" German J. Psychiatry 14(2):55-60 (2011).

Rueda, et al., "Training, maturation, and genetic influences on the development of executive attention" Proc. Natl Acad. Sci. 102(41):14931-14936 (2005).

Salthouse, et al. Age and Experience Effects in Spatial Visualization. Developmental Psychology 26(1): 128-136 (1990).

Shallice, "Specific impairments of planning", Phil. Trans. R. Soc. Lond. B 298, (1982), pp. 199-209, Great Britain.

Shepard, et al. "A Chronometric Study of Mental Paper Folding," Cognitive Psychology, 3(2):228-243 (1972).

Sheridan, "Review: candy train—full steam ahead", posted in Endless, Games, iPad, iPhone (2011); http://applenapps.com/review/candy-train#,VEXvrSKsUcY.

Sohlberg, "Effectiveness of an attention-training program," J Clin Exp Neuropsychol 9 (2):117-30 (1987).

Spelke, et al. "Skills of undivided attention" Cognition 4(3):215-230 (1976).

Treisman, et al., A feature-integration theory of attention. Cognitive Psychology 12 97-136 (1980).

Turner, et al. "Is working memory capacity task dependent?" J. Memory and Language, 28(2):127-154. (1989).

* cited by examiner

US 10,692,029 B2

SYSTEM AND METHOD FOR MULTIPLE TIMER MANAGEMENT TASK FOR ENHANCED COGNITION

CROSS-REFERENCE

This application is a continuation of U.S. Ser. No. 14/668,182, filed Mar. 25, 2015, which claims the benefit of U.S. Provisional Application No. 61/970,755, filed Mar. 26, 2014, by David Ethan Kennerly, et al., entitled System and Method for Multiple Timer Management Task for Enhanced Cognition, which applications are incorporated herein by reference.

BACKGROUND

Navigating our ever-increasingly information intensive world often requires the cognitive ability to switch between multiple ongoing streams of incoming information and the ability to react to these streams in a timely, accurate and thoughtful manner. Even an act as simple as walking down a busy street requires that a person divide their attention across multiple moving objects (cars, pedestrians, bikes, etc.), and plan movements to avoid collisions while proceeding in an efficient manner toward a destination. Thus, a tool for improving the cognitive processing required by a person for such engaging in such highly reactive situations is desirable.

SUMMARY

Cognitive training exercises that are designed to target an ability of a user to track multiple ongoing streams of information concurrently and to correctly and efficiently perform one or more actions related to these streams to achieve an end goal are described herein. An exemplar metaphor used for theming this exercise is that of a barista working in a coffee shop, bar or establishment. The user assumes the role of the barista, for example, taking orders for various types of drinks that might be purchased at a coffee shop. The user then needs to manage the production of these orders to perform well within an optimal time period. The system is configurable to increase the challenge presented to a user in response to prior performance by, for example, adding additional orders, adding additional machines for producing beverages, adding additional beverage types available for order. The system is also configurable to dynamically increase the difficulty of the challenge in response to one or more of a user's performance, a passage of time, or any other variable that is desirable. In addition, the system is configurable to enable the user to flip between screens presented and/or to switch between orders and machines viewable by the user at a given time resulting in an increased memory requirement for the user.

These operations of the system are naturalistic, intuitive and target core cognitive skills important for success in everyday life. The processes of tracking multiple streams of information spatially and temporally are sub served by neural mechanisms housed largely in the frontoparietal attentional network of the brain. Thus, training on this exercise is expected to enhance the operations of these critical brain systems.

An aspect of the disclosure is directed to a method of enhancing a cognitive ability of a user, comprising: conducting, via a user interface display of a user computing device, a training session comprising: presenting, via the user interface display of the user computing device, an order processing device having one or more order processors with an order actuator to control the one or more order processors, an order queue, one or more order cards, one or more order components, and one or more order fulfillment containers; displaying to the user, via the user interface display of the user computing device, the order processing device, one or more order processors, one or more order actuators, one or more order cards in the order queue, and one or more order components; allowing the user, via the user interface display of the user computing device, to select one or more order components for one of the one or more order containers and to actuate an order commencement. The method can include compiling, via the computing device, an order processing device having one or more order processors with an order actuator to control the one or more order processors, an order queue, one or more order cards, one or more order components, and one or more order fulfillment containers, In some configurations, the order processing device has a plurality of order actuators. The order actuator controls the order commencement and an order completion. Additionally, the method can include recording, via the user computing device, whether the user successfully commences and completes an order in the order queue. Furthermore, an order can comprise a representation of one or more order components within an order sheet. A complexity of the training session is determinable by the user computing device from at least one of: a number of orders, a number of order components, an order of processing the orders in the order queue, a number of completed orders, and a number of incomplete orders. Additionally, the system can enhance the complexity of the training session by having the user, via the user interface display of the user computing device, to begin a plurality of orders, monitor a completion status of a plurality of orders, and select a termination time for a plurality of orders. Moreover, increasing or decreasing, via the user computing device, the complexity of the training session according to user performance during the training session.

Another aspect of the disclosure is directed to an apparatus for enhancing a cognitive ability of a user, comprising: a user computing device configured to: conduct a training session, utilizing a user interface display of the user computing device, comprising: presenting, via the user interface display of the user computing device, an order processing device having one or more order processors with an order actuator to control the one or more order processors, an order queue, one or more order cards, one or more order components, and one or more order fulfillment containers; displaying to the user, via the user interface display of the user computing device, the order processing device, one or more order processors, one or more order actuators, one or more order cards in the order queue, and one or more order components; allowing the user, via the user interface display of the user computing device, to select one or more order components for one of the one or more order containers and to actuate an order commencement. The apparatus can include compiling, via the computing device, an order processing device having one or more order processors with an order actuator to control the one or more order processors, an order queue, one or more order cards, one or more order components, and one or more order fulfillment containers, In some configurations, the order processing device has a plurality of order actuators. The order processing device of suitable apparatus can have a plurality of order actuators. Additionally, the order actuator can be configurable to control the order commencement and an order completion. Additionally, the apparatus can record, via the user computing device, whether the user successfully commences and completes an order in the order queue. Orders can comprise a representation of one or more order components within an order sheet, ticket or card. A complexity of the training session is of the apparatus is determinable by the user computing device from at least one of: a number of orders, a number of order components, an order of processing the orders in the order queue, a number of completed orders, and a number of incomplete orders.

Still another aspect of the disclosure is directed to a machine readable medium storing instructions that, when executed by a computing device cause the computing device to perform a method comprising: conducting a training session comprising: presenting an order processing device having one or more order processors with an order actuator to control the one or more order processors, an order queue, one or more order cards, one or more order components, and one or more order fulfillment containers; displaying to the user, via the user interface display of the user computing device, the order processing device, one or more order processors, one or more order actuators, one or more order cards in the order queue, and one or more order components; allowing the user, via the user interface display of the user computing device, to select one or more order components for one of the one or more order containers and to actuate an order commencement. The machine readable medium is configurable such that the order processing device has a plurality of order actuators. Additionally, the order actuator controls the order commencement and an order completion. In some configurations, the machine readable medium of claim can record, via the user computing device, whether the user successfully commences and completes an order in the order queue. Suitable orders comprise a representation of one or more order components within an order sheet. A complexity of the training session is determined by the user computing device from at least one of: a number of orders, a number of order components, an order of processing the orders in the order queue, a number of completed orders, and a number of incomplete orders. In some configurations, the machine readable medium is configurable to enhance the complexity of the training session by having the user, via the user interface display of the user computing device, to begin a plurality of orders, monitor a completion status of a plurality of orders, and select a termination time for a plurality of orders. Additionally, the machine readable medium can increase or decrease, via the user computing device, the complexity of the training session according to user performance during the training session.

Another aspect of the disclosure is directed to a non-transitory computer readable medium having stored thereon instructions executable by a processor, the instructions comprising instructions for: conducting a training session comprising: presenting an order processing device having one or more order processors with an order actuator to control the one or more order processors, an order queue, one or more order cards, one or more order components, and one or more order fulfillment containers; displaying to the user, via the user interface display of the user computing device, the order processing device, one or more order processors, one or more order actuators, one or more order cards in the order queue, and one or more order components; allowing the user, via the user interface display of the user computing device, to select one or more order components for one of the one or more order containers and to actuate an order commencement. The disclosure includes a computer program product embodied on a non-transitory computer readable medium comprising code for presenting an order processing device having one or more order processors with an order actuator to control the one or more order processors, an order queue, one or more order cards, one or more order components, and one or more order fulfillment containers; code for displaying to the user, via the user interface display of the user computing device, the order processing device, one or more order processors, one or more order actuators, one or more order cards in the order queue, and one or more order components; code for allowing the user, via the user interface display of the user computing device, to select one or more order components for one of the one or more order containers and to actuate an order commencement.

Yet another aspect of the disclosure is directed to an apparatus means for enhancing a cognitive ability of a user, comprising: a user computing means configured to: conduct a training session, utilizing a user interface display means of the user computing means, comprising: presenting, via the user interface display means of the user computing means, an order processing device having one or more order processors with an order actuator to control the one or more order processors, an order queue, one or more order cards, one or more order components, and one or more order fulfillment containers; displaying to the user, via the user interface display means of the user computing means, the order processing device, one or more order processors, one or more order actuators, one or more order cards in the order queue, and one or more order components; allowing the user, via the user interface display means of the user computing means, to select one or more order components for one of the one or more order containers and to actuate an order commencement.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the disclosure are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

DETAILED DESCRIPTION

An aspect of the disclosed exercise is for a user to manage multiple orders in real-time under time constraints while also having the user to switch tasks to observe and configure, for example, new orders. The exercise is configurable to provide that users frequently switch tasks, for example, between observing one or more orders, configuring one or more orders, and tracking progress of one or more orders.

A gameplay mechanism involves, for example, receiving one or more orders at a time, selecting one or more ingredients required to complete each of the one or more orders, initiating the creation of the order through a processor, and stopping the processor within a window of time that, for example correlates to an ideal time of completion of the ordered item. Concurrently, new orders can be received.

Where the gameplay mechanism involves, for example, a coffee drink, selecting the ingredients for that coffee drink, starting the virtual machine to make that coffee drink, and then stopping the virtual machine when the drink is made and ready for completion of the virtual order. The ideal time of completion can vary from user to user and can be determined by the system based on a variety of factors or parameters that are evaluated by the system. A physically intuitive representation of an order then animates into view based on the system's configuration. In a current implementation, this game play can be represented by one or two image ingredients on an order card, order ticket or order sheet, although other representations could be substituted without departing from the scope of the disclosure. A corresponding ingredient button is selectable by a user by, for example, pointing and clicking a desired location with a computer mouse or other pointing device in 2D or 3D space, or by touching a location desired on a touch-sensitive input device. Buttons can be represented by icons of, for example, accessory ingredients for a cup of coffee that are associated with one of many coffee brewing machines. When an ingredient is selected, a representation can appear at an order receptacle, such as a cup below the spout of a coffee machine. Alternatively, the representation can appears, and change size once the ingredients are selected, e.g., from a single espresso to a double espresso.

Figure 1:
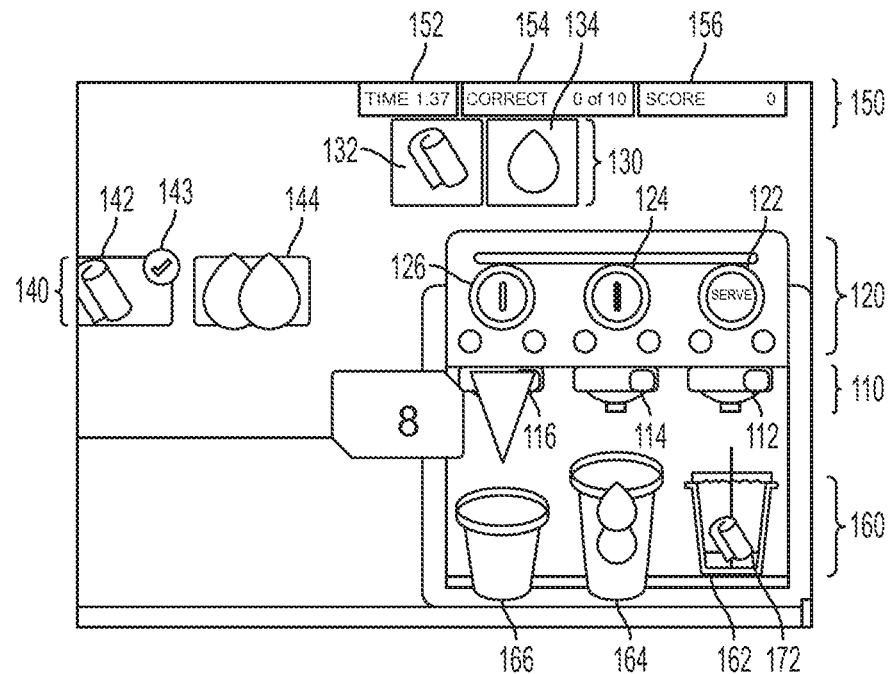
FIG. 1 illustrates a screen shot wherein buttons are represented by icons of ingredients or accessory ingredients for a drink order.

Turning to the embodiment shown in FIG. 1, a user is presented with a screen 100 that presents a processor 110 such as an espresso machine, that is capable of completing one or more orders at a time via processor units which are comprised of individual processor units 112, 114, 116, controlled by actuators 120. Each individual processor unit 112, 114, 116 can be configured to have a corresponding unit actuator 122, 124, 126 which, when selected by the user, starts or stops the processing for the corresponding processor unit. The order is then placed into a corresponding order receptacle 160. A order components 130 can be displayed which further comprise individual order component elements 132, 134 for the user along with a series of new orders on order tickets in an order queue 140 or list can be displayed for the user where the new orders appear in the order queue 140 which further comprise individual orders 142, 144. In the coffee drink example, the processor 110 is an espresso machine, and the individual processor units 112, 114, 116 are the individual group heads on an espresso machine. Additionally, the unit actuator 122, 124, 126 associated with the individual group heads of the espresso machine change icons for ready to start (unit actuator 122), processing or creating the ordered drink (unit actuator 124), and ready to serve (unit actuator 126). A heads-up display 150 is provided which displays, for example, the time 152, or elapsed time, the number correct 154 and a total score 156.

When the game starts, the user sees one or more individual orders 142, 144, where each order is an order card, ticket or sheet in an order queue 140 and then clicks on the order components corresponding to the order, followed by the start button. Thus, for example, a first order of the order queue 140 is comprised of an icon corresponding to the drink order, in this case two tear drops. The user selects the tear drop shaped icon (individual order component element 132) twice to correspond to the two tear drops in the drink order, and then an actuator to start the order. In the example, displayed, the order container 164 illustrates that the user has selected the tear drop icon (independent order component element 132) twice and has already started the process of making the drink ordered and shown in the order queue 140. As the drink is created an indicator 172 will appear to indicate a fluid level and will change within the order container 162 indicating a level of completion for a particular order that is in process.

Other physical representations could be substituted for the espresso machine and coffee drinks, such as fruit and juicers for creating customized juice drinks.

Figure 2:
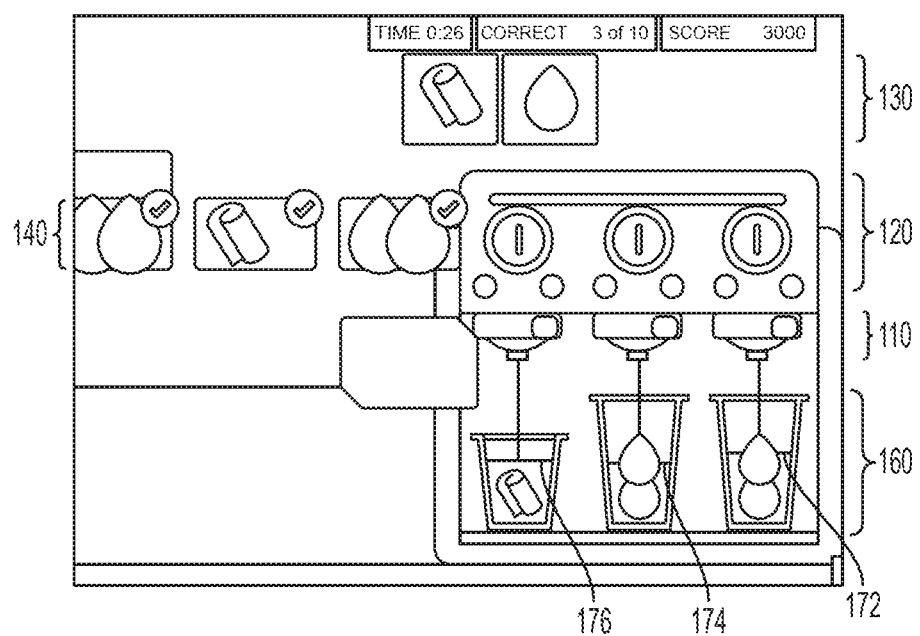
FIG. 2 illustrates a screen shot wherein buttons designate ingredients requested in an order that may be selected to load into a processor.

When selecting the ingredients or order components 130 that correspond to a unique order in the individual orders 142, 144, 146, the selected ingredients will appear within a corresponding order container 162, 164, 166. Additionally, an indicator 172, 174, 176 can appear on the corresponding order container 162, 164, 166 as shown in FIG. 2 alerting the user that the order with selected components is in process. Alternatively, once an order is in process, the order can be removed from the order queue 140 altogether, either automatically or with user interaction. The system is configurable to allow for a maximum number of ingredients allowed per order. In some configurations, selecting a maximum number of allowed ingredients or selecting different ingredient can shift the selection to another available processor on the current page of processors in view. After selecting an ingredient for a processor, a button icon can then appear. Alternatively, a status change can be represented on the screen to enable the user to begin processing. Pressing the button on the processor starts processing the ingredients according to the selected order. The duration of the processing depends on the number of ingredients. Thus a user must be cognizant of the amount of time it will take to complete a single ingredient drink vs. a double ingredient drink, stop the processing before the drink runs over (which results in spoilage and an "incomplete" for the order), and begin processing another drink based on outstanding orders. If a user selects components for a drink that has not been ordered, then the user can empty the order container by selecting the order components within the container. Alternatively, if the order is completed, the user will not receive credit for completing an item that was not in the order queue when the order was started.

Figure 3:
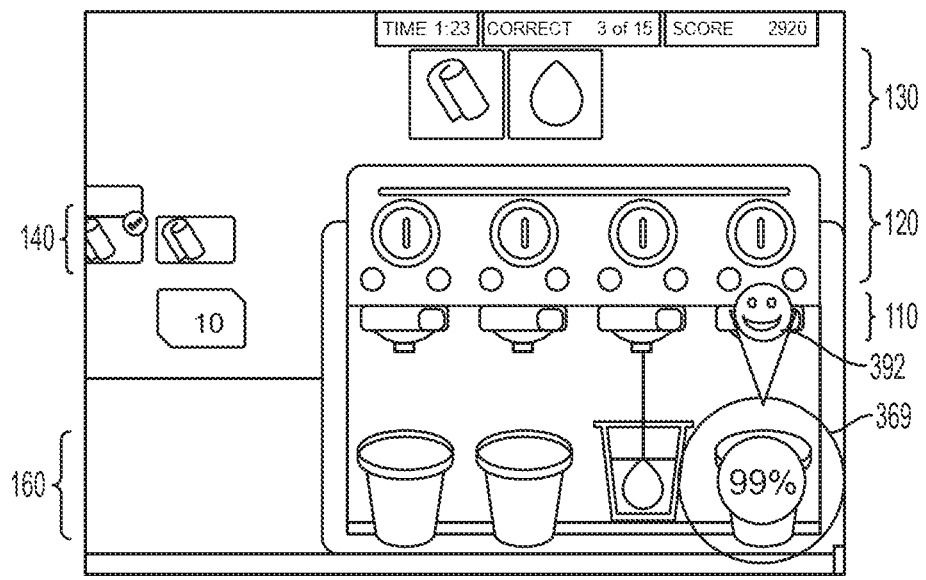
FIG. 3 illustrates a screen shot wherein a meter indicates the progress of the processing.

As will be appreciated, a one-ingredient order processes and finishes much quicker than a two-ingredient order, and so on, which is indicated in this configuration by the height of the progress meter shown as liquid filling up the cup. The progress meter can, for example, be represented by dripping coffee into a small or large cup. Other visual representations of progress and an ideal or optimal completion time, such as pouring juice into a small or large glass could be substituted without departing from the scope of the disclosure. Once the order is started by selecting the actuation button, progress continues automatically until the user terminates the process. When the progress reaches a threshold of being nearly complete, another button on the processor can appear to indicate that the process is completing. Once the alert is activated, a user will have a limited amount of time to select completion of the order before the order is lost. Selecting this button can indicate serving the order. Thus, pressing this button indicates the accuracy of the timing of the service, which correlates to the fullness of the progress meter, and multiplies the score. As shown in FIG. 3, the once the user selects completion by activating actuators 120 that corresponds to the processor 110 which is associated with the order receptacle 160 (e.g., cup icon) for the order, an order indicator 392 can appear that provides feedback to the user as to whether the order was completed properly. As shown in FIG. 3, a "smile face" icon indicates that the order was completed properly. Additionally, a level of completion icon 369 can provided which alerts the user to the level of completion. As shown, an encircled number is shown which reflects the percentage of completeness of the order. An ideal performance by the user is equal to or approaches but does not exceed 100%. Once over 100%, the order is subject to spoilage and is not counted as a completed order. Other icons can be used without departing from the scope of the disclosure.

Figure 4:
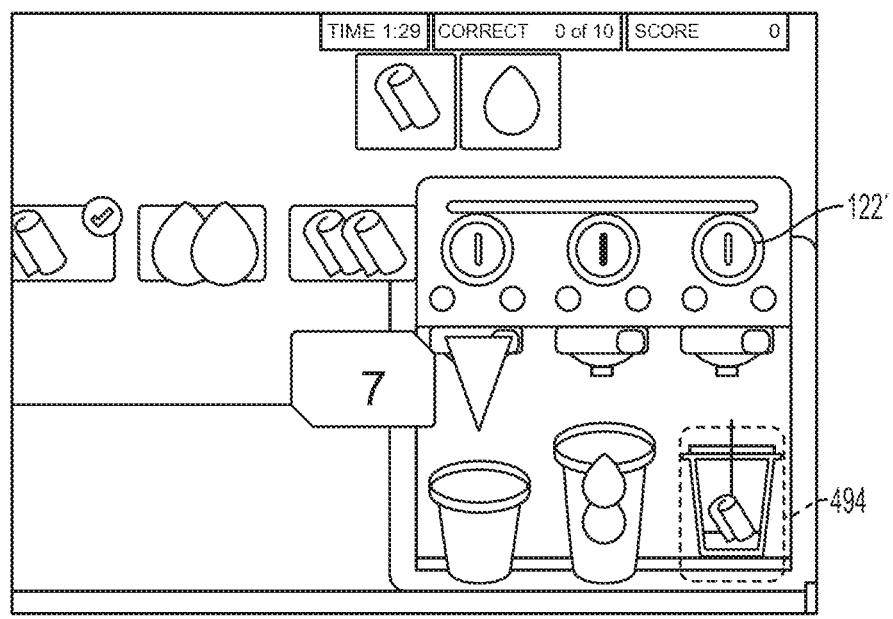
FIG. 4 illustrates a screen shot wherein an indicator designates the order is ruined if the processor is left unattended for a period of time outside an predetermined acceptable range.

Turning to FIG. 4 once the order is completed, the processor is then emptied and available to be reloaded with another set of ingredients for another order. If the processor is not attended to, then a progress meter 494 fills and begins to regress during a past due phase. If the button 122' to serve is not pressed soon, then button to serve the order disappears and an indicator alerts the user to empty the processor by selecting its ingredients. Additionally, at any time if a user placed the wrong ingredients into a processor, the user may empty the ingredients by clicking the ingredients in the cup.

Figure 5A:
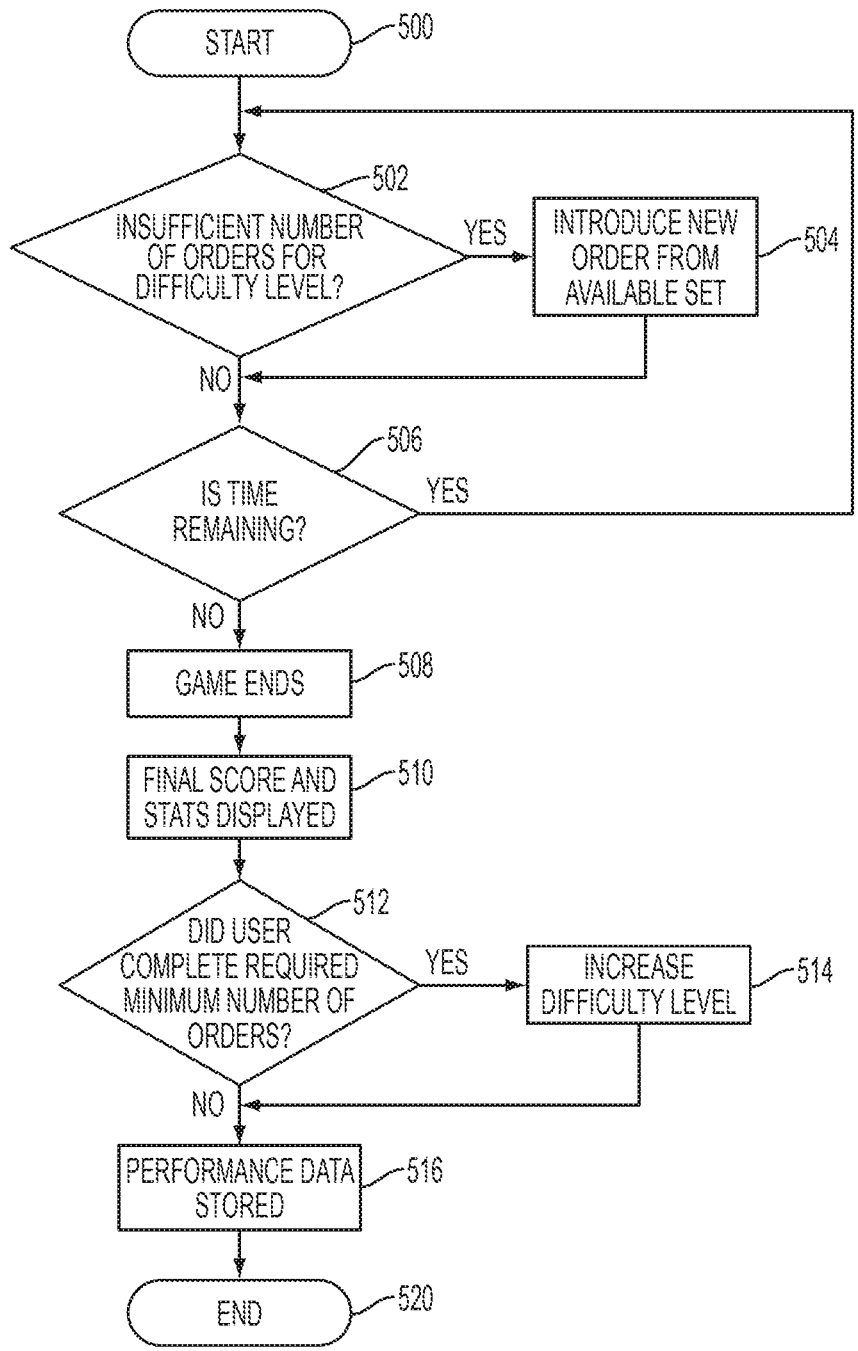
FIGS. 5A-B are flow diagrams showing the game flow.
Figure 5B:
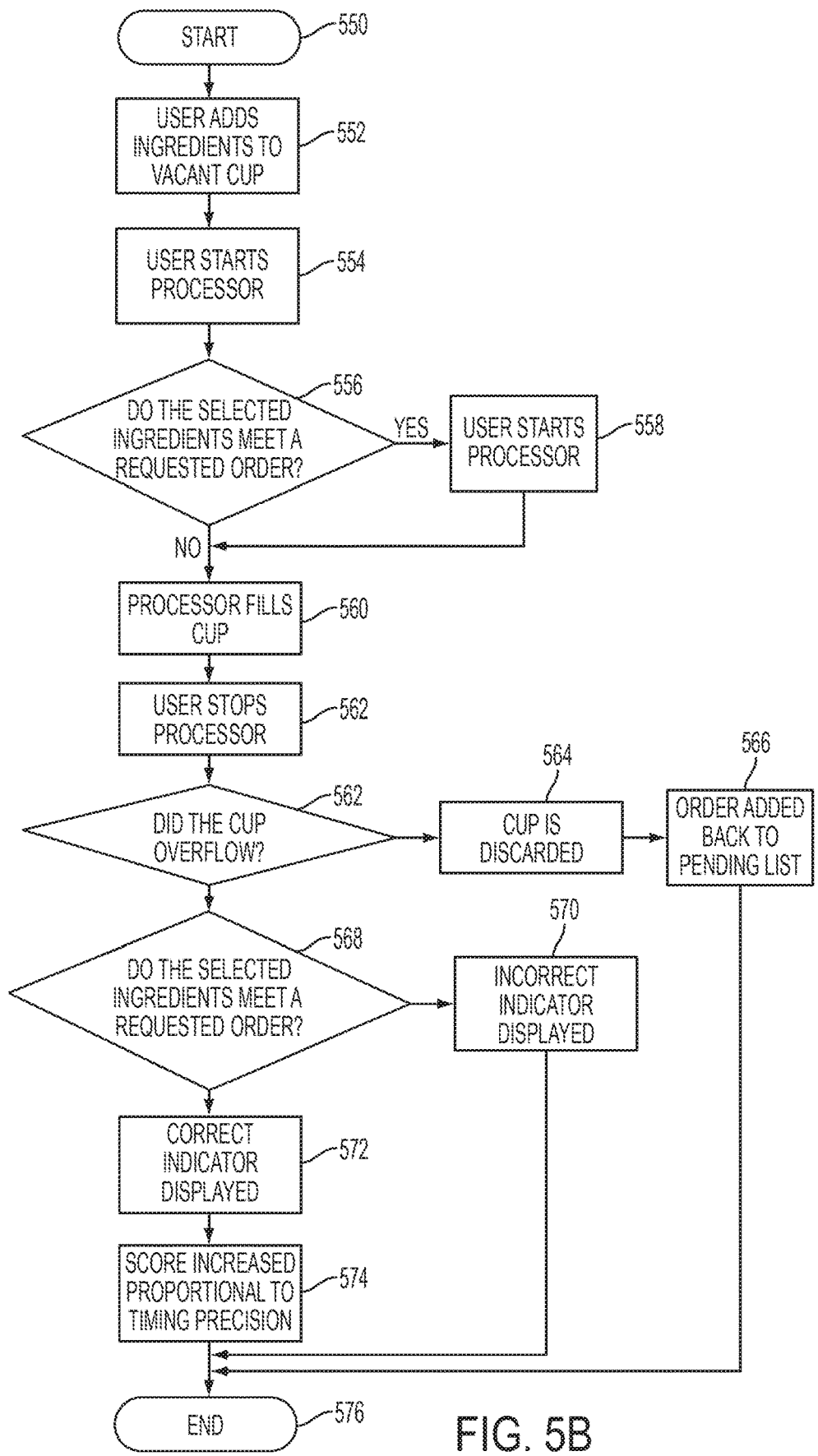

As will be appreciated from FIGS. 5A-B, game flow can have more than one process. In FIG. 5A, the game flow starts 500. The system then determines whether there is a sufficient number of orders (or insufficient number of orders) for the difficulty of game level to be played 502. If there are an insufficient number of orders for the difficulty level, then one or more new orders are introduced from an available order set 504. If there are a sufficient number of orders, or once additional orders are added from the order set, the system determines whether time is remaining 506. If there is no time remaining, the game ends 508, and a final score and/or game statistics are displayed to the user 510. Once the game is complete, the system determines whether the user completed a required minimum number of orders appropriate for the game level that was played 512. If a minimum number of orders were completed, then the game level difficulty is increased 514. If a minimum number of orders were not completed, then the game level stays the same or, is some circumstances, is decreased. Performance data is stored 516, after which the game play ends 520. As will be appreciated by those skilled in the art, storing of performance data can include storage of a next game level. Alternatively, an assessment of next game level can occur prior to commencing the game on a subsequent game play.

Turning now to the flow shown in FIG. 5B, the game flow starts 550. A user then adds ingredients to, for example, a vacant cup 552. The user then starts a processor for the cup having ingredients 554. The system then determines whether the user selected ingredients meet a requested order 556. If the ingredients do meet a requested order, then the order is removed from the order queue 558. The processor fills the cup 560, when the cup appears to approach completion, the user stops the processor 562. The system then determines whether the user stopped the processor prior to the cup overflowing 562. If the cup overflows then the cup is discarded 564 and an order is added to the order queue or pending list 566. If the cup did not overflow, then the system determines if the ingredients selected by the user for the order and identified in the cup meet a requested order in the order queue 568. If the selected ingredients do not meet an order from the order queue, then an incorrect indicator is displayed 570. As will be appreciated by those skilled in the art, the comparison to the order queue is for an order in the queue at the time the order was started by the user. If the selected ingredients do meet an order from the order queue, then a correct indicator is displayed 572 and the user's score is increased 574. The increase of score can be proportional to the timing precision of when the user stopped the order processing, i.e., how close the user approached 100% completion of the order without spoilage. This game play is repeated until there are no additional orders in the order queue at which point the game play ends 576.

Figure 6:
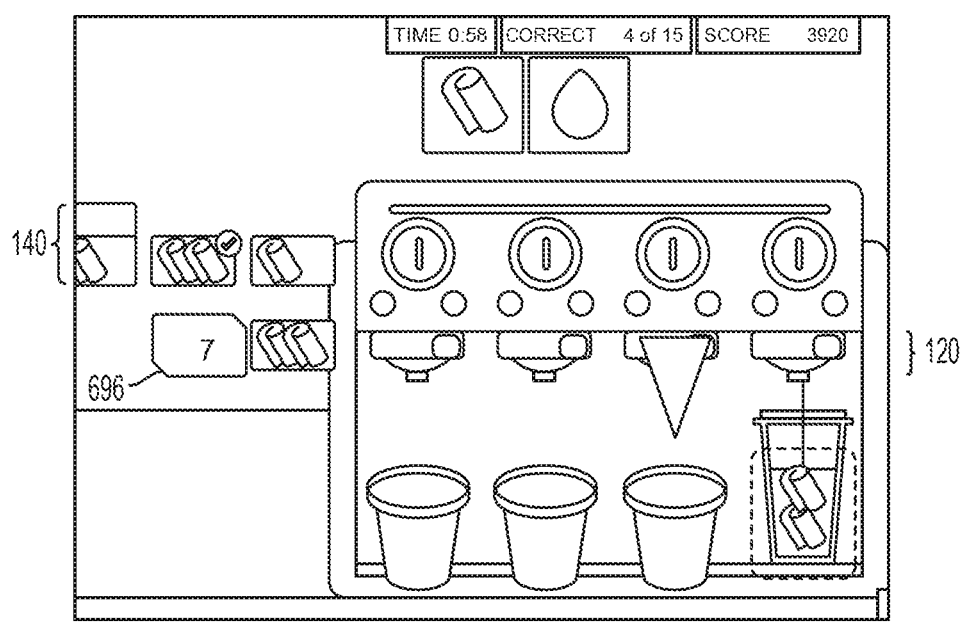
FIG. 6 illustrates a screen shot wherein the lower levels of the game are configurable to contain fewer processors and fewer maximum number of simultaneous customer orders.

Multiple orders appear in an order queue 140 and up to as many actuators 120 exist. When one order is served, then that order disappears from the queue and other another order animates in the queue. As shown in FIG. 6 an indicator 696 presents the number of orders remaining in the total queue that have not yet appeared in the visible queue of the order queue 140. Serving all of the orders within the time limit provided for in the game ends the exercise with an indication that all orders were served. On the other hand, if the time limit is reached before all orders were served, then the exercise ends with an indication that time was exhausted.

Figure 7A:
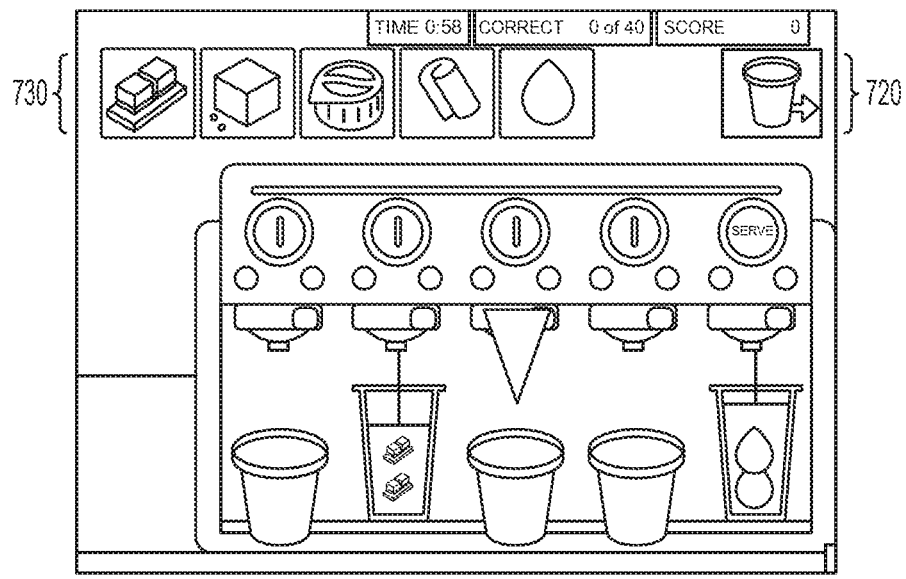
FIGS. 7A-B illustrates a screen shot wherein the higher levels of the game are configurable to contain more processors and simultaneous orders that appear on multiple pages.
Figure 7B:
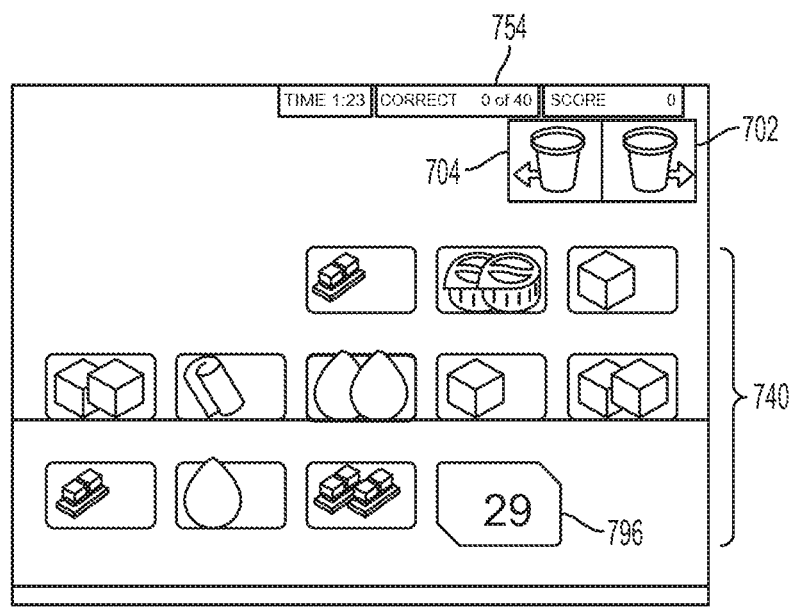

Task difficulty can be moderated in a variety of ways. Task difficulty provides an increase in training to the user which results in an increase in the user's cognitive ability to track multiple ongoing streams of information. The process of assessing the user's performance and then altering the game administered, the user is trained and will increase cognitive ability over time. In one configuration the system moderates the task difficulty by analyzing a set of parameters. Thus the system is configurable to, which increases to adapt to a user's skill. The configurable parameters which are adaptable to the user are the number of processors and simultaneous orders in an order queue 740, a number of total orders to serve 754, the number of ingredients that may be ordered 730, the rate or speed at which new orders arrive, the number of single ingredient orders (which take a shorter amount of time to process) and the number of multiple ingredient orders (which take a longer amount of time), and whether the order queue appears on the same screen (as shown in FIG. 6) or on a separate screen (as shown in FIG. 7B). The parameters are the number of processors and simultaneous orders and the number of total orders to serve. Task difficulty is primarily defined by the number of processors. When there are too many processors and simultaneous orders to comfortably present on the screen, the orders and processors are distributed among multiple screens. By placing, for example, an order queue in one screen as shown in FIG. 7B and the processing in another screen as shown in FIG. 7A, the user must look at the orders in the order queue, return to the processing screen and fill the orders from memory. If the user cannot recall enough orders to accurately begin the processing, time is taken from processing to return to the order queue screen to review the orders. Additionally timing of review of the order screen must be carefully balanced by the order to avoid a situation where the user is reviewing the order queue screen and returns to the order processing screen after an order has been completed and becomes spoilage. Navigation between the order queue screen and the order fill screen can be achieved by the use of suitable navigation icons 702, 704.

In this configuration, buttons appear to scroll between the screens. The initial screen presents the current orders. Other screens present the ingredients and processors. At difficult configurations, the buttons that scroll may indicate the maximum progress of the processors on the page in that direction. In a current implementation this is represented by a progress meter of a cup of filling coffee on the scroll button, although other representations could be substituted without departing from the scope of the disclosure.

Figure 8:
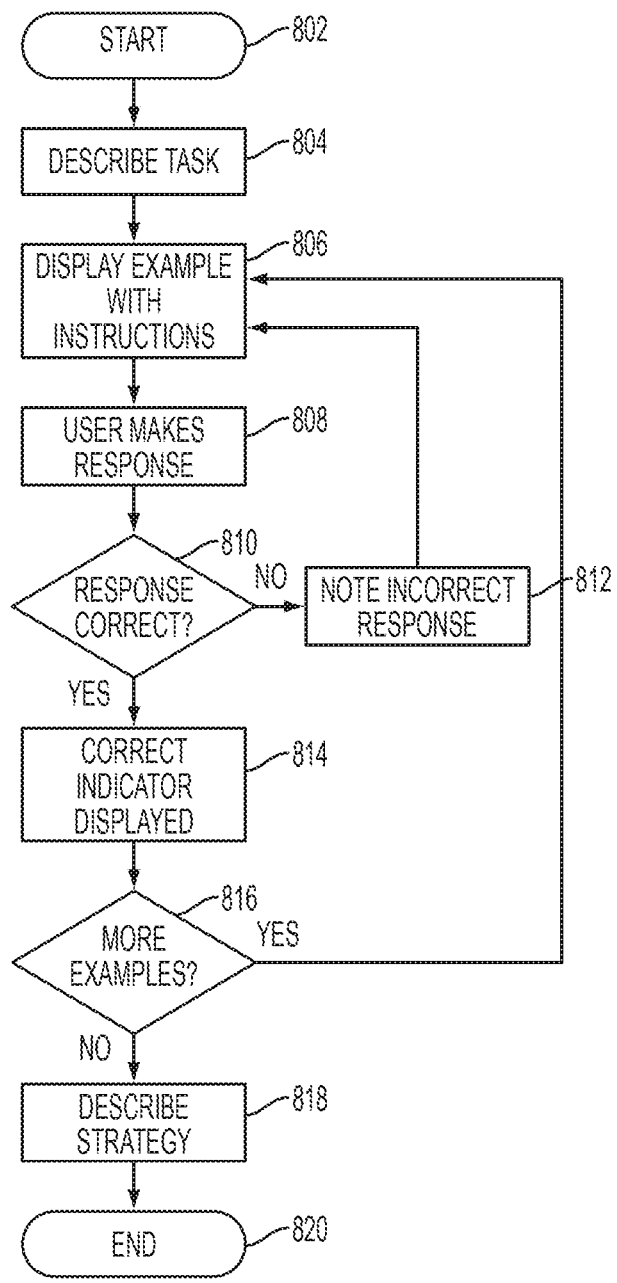
FIG. 8 is a flow diagram illustrating tutorial flow for the game.
Figure 9A:
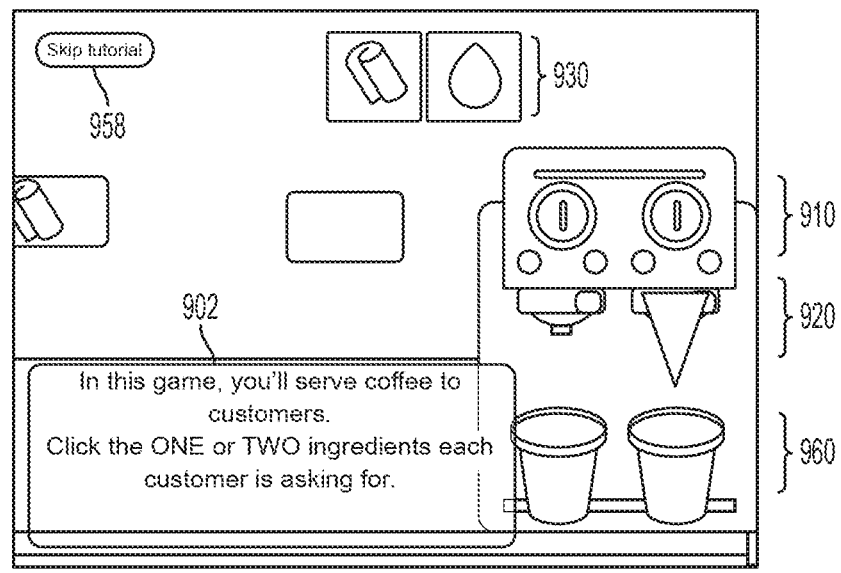
FIGS. 9A-B illustrates a screen shot wherein a tutorial is configurable to describe a method of interaction through a series of prompts to the user.
Figure 9B:
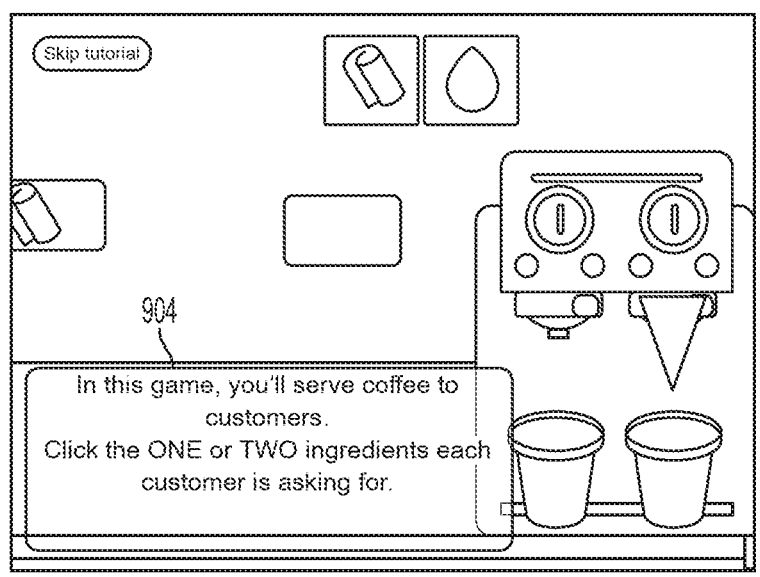
Figure 10A:
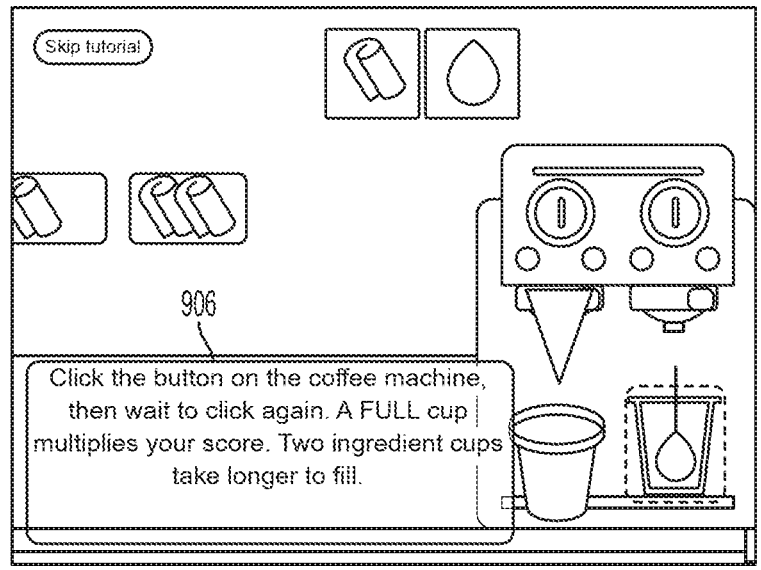
FIGS. 10A-B illustrates a screen shot wherein a tutorial is configurable to provide interactive feedback.
Figure 10B:
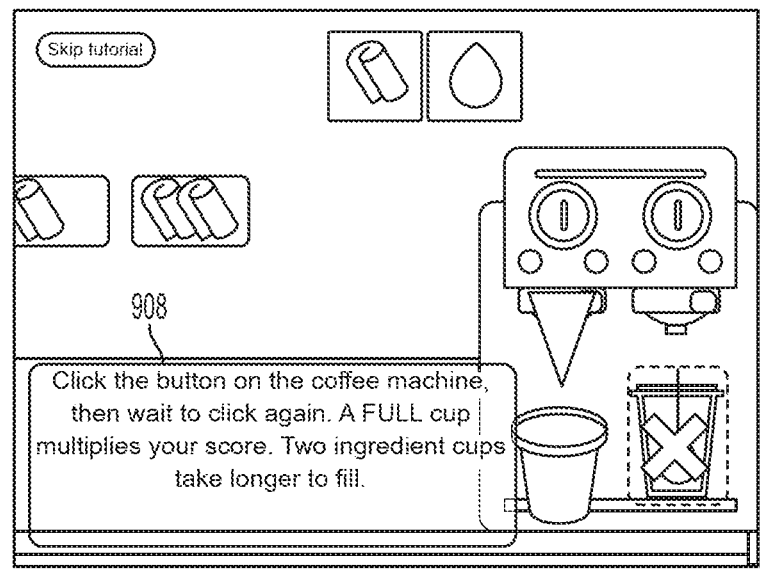

The user can be introduced to the training exercise via a short interactive tutorial describing the gameplay elements. A flow of the tutorial is shown in FIG. 8. The tutorial starts 802 and then describes a task 804, such as "someone let the coffee overfill, press the button to discard," or "you'll be serving coffee to customers, order tickets show up here." An example is displayed with instructions 806 such as "the order asks for sugar, click the sugar jar to add sugar to the cup." Additional prompting can be provided, for example, by adding an animated feature which draws the user's attention to the icon that should be selected. The system determines if the user has made a correct response 810. If the correct response is made a correct indicator may be displayed 814. Alternatively, the system can proceed to providing instruction on the next step, such as "click the button to start filling the cup." The coffee cup begins to fill and the user is advised "once the coffee reaches the fill line press the green button to serve it." An animation can be provided to draw the user to the correct selection. If the button is not selected to serve the coffee in time, then a red button appears with accompanying instructions "the coffee overflowed. click the red button or cup to throw it away." If the correct ingredient is not chose, then the system prompts the user that "you're making the wrong order, click the cup to throw it away and start again." When the correct order is placed and completed, the user receives points for completing the order. In other configurations, the user may be able to select completion at any time prior to completion with points varying depending on the percentage of completion. The user can be provided more examples 816, as desired. Once the user has accurately completed a range of orders, a screen can be provided which describes the strategy of the game 818 prior to ending the tutorial 820. Where the response is incorrect, the system notes the incorrect response 812 and then displays another example with instructions 806. The tutorial can comprise a series of prompts for the user to complete a series of simple game configurations with guided messages.

Figures 11, 12:
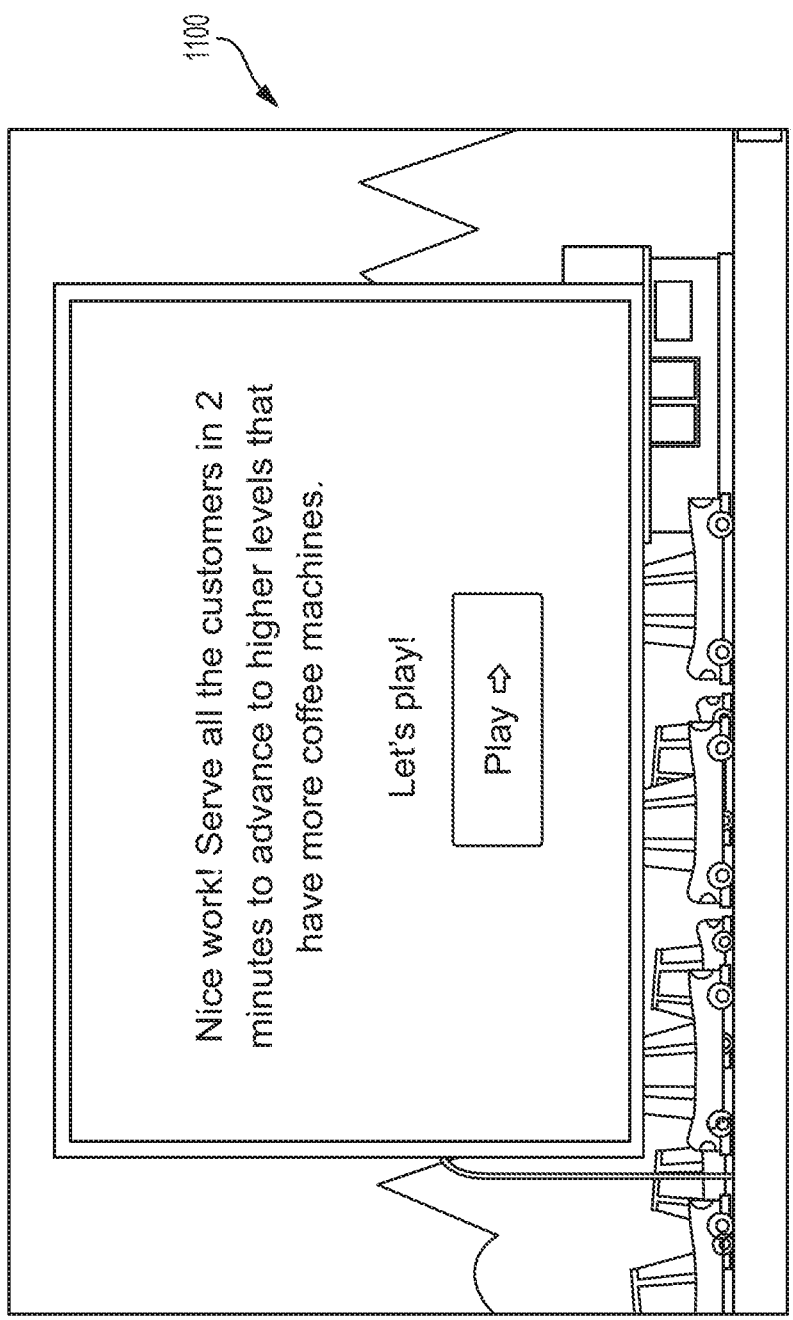
FIG. 11 illustrates a screen shot wherein a tutorial is configurable to end by describing the strategy of the game.
FIG. 12 illustrates a heads-up display configurable to appear on a screen wherein the display indicates a current score for deliveries and time bonus in the trials so far.

As shown in FIGS. 9A-B, and 10A-B, important gameplay features such as a customer order 940, ingredient button 930, number of ingredients, processor (e.g. espresso machine) start button 920, processor progress meter, and the method of input to select an ingredient, starting a processor and serving the ingredients of a processor are explained with animations. The user can skip tutorial at any time by selecting the skip tutorial button 958. Interactive feedback 902, 904, 906, 908 informs users of their success in understanding the task, and players are given the chance to retry after missing the window to serve an order or serving the wrong order. After a number of successful trials, the player is invited to start the game 1100 as shown in FIG. 11. The tutorial may be recalled in the future, on demand or in response to performance, if a player needs to be reminded how to play and dismissed if not needed. A heads-up display 150 such as illustrated in FIG. 12 can be provided that indicates the remaining time 152 available to the user in the current game scenario to process orders, the number of orders served and the total number to serve or the total number of correct orders served and the total number to serve 154 and the user's current game score 156.

Figure 13:
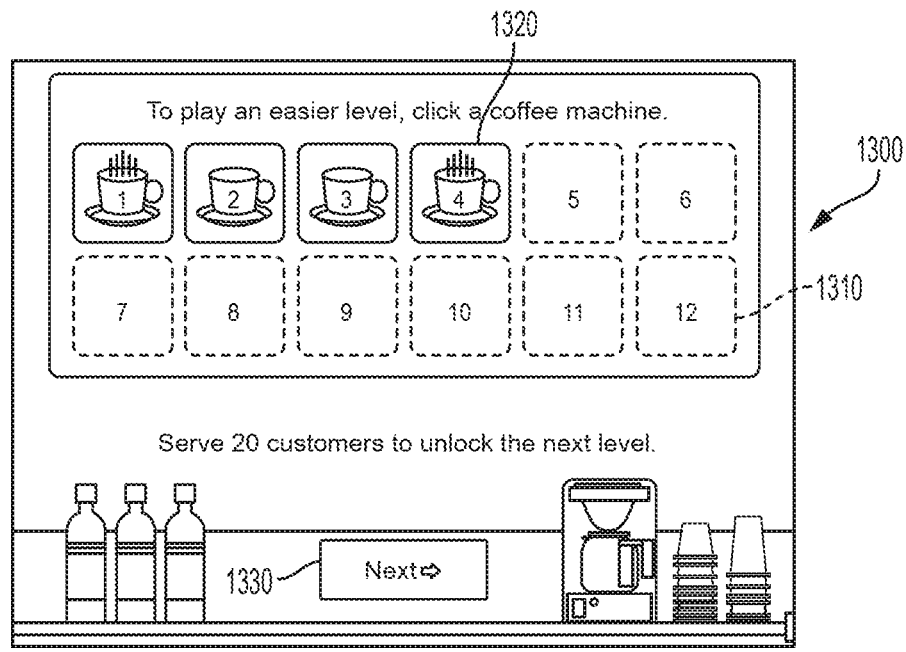
FIG. 13 illustrates a screen shot illustrating an example of how a measure of progress is provided to a user.

Before beginning the main gameplay, the user can be presented with a screen 1300 that illustrates high-level status the user's current of progress through available levels of difficulty as shown in FIG. 13. If the current game has a difficulty level of 12 and the user has reached a difficulty level of 4, then the screen depicts 12 spaces 1310 for the 12 levels of difficulty, with four of the as spaces further depicting an icon representing completion 1320. Additionally, the user can be advised how many customers need to be served during the game play to unlock the next level, or advance to the next level of difficulty. At the beginning of the game, the user can proceed at the most recent level achieved or select an easier level (if available) from the earlier levels displaying a completion icon 1320. Once the user makes a decision, the user selects a next button 1330 to proceed with gameplay at the selected level of difficulty.

Figure 14:
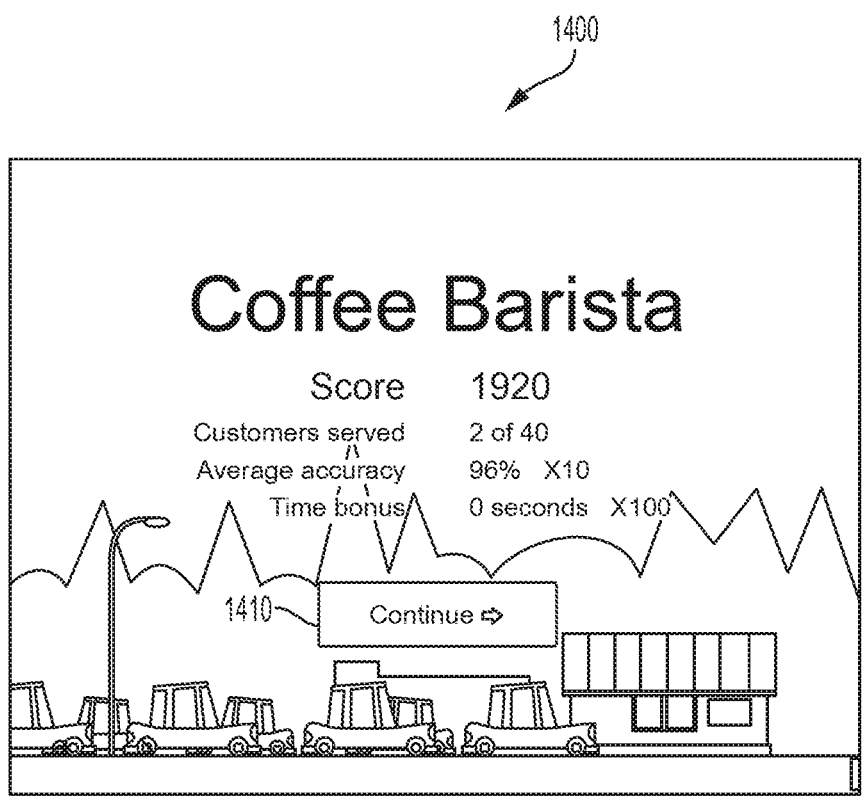
FIG. 14 illustrates a screen shot that illustrates a final result screen containing a score for a user, a correct number, and an average accuracy of timing of each order.

After finishing a number of correct trials or exceeding a time limit, a review screen 1400 displays the score for pickups and an optional time bonus if the user finished early as shown in FIG. 14. A score can be provided, along with a number of customers served vs total number of customers available to serve in the level played, a rate of accuracy for the drinks prepared, and any time bonus that applies for handling orders efficiently. After reviewing the review screen 1400, the user can select continue or next 1410 to proceed.

Figure 15:
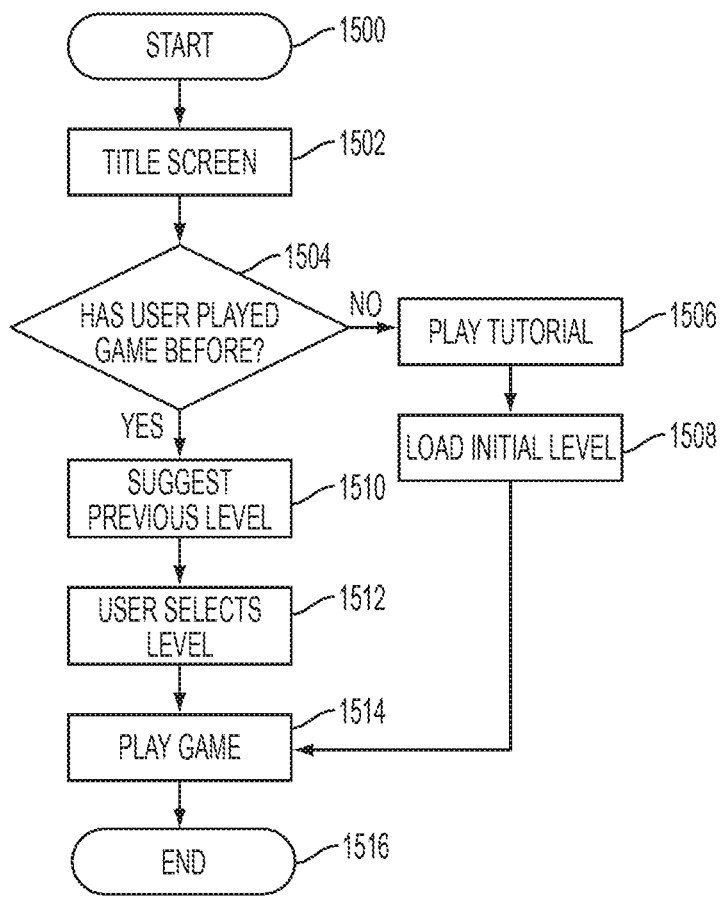
FIG. 15 illustrates a flow diagram for directing players to play a tutorial and setting game difficulty.

As described above and shown in FIG. 15, if all orders are completed within an optimal time limit, then the level of difficulty of the next session increases. The system starts 1500, presents a title screen to the user 1502 and queries the user whether the user has played the game before 1504. If the user has not played the game before, then the system may play a tutorial 1506 after which an initial level of difficulty may be loaded 1508. If the user has played the game before, the system presents the user with a summary of the highest level achieved and suggests proceeding at the prior achieved level 1510. The user then selects a level 1512 and selects playing the game 1514 or proceeds to playing the game 1514 at which point the system defaults to playing at the last highest level achieved. Once the game is played, the system displays the results. Once the game is completed, the system determines whether the user completed all rounds successfully. If all rounds were completed successfully, the system unlocks a next level of game play. Thereafter, or even if not all rounds were completed successfully, the system stores the results (e.g., the same level or the higher level achieved) and the process ends 1516. Instruction describes that to unlock a higher level of difficulty, all the orders of the highest available level of difficulty must be served, though other unlocking criteria are possible. If all orders are served, then a screen afterward and before the score review indicates the next level with an additional processor is presented.

In engaging the systems and methods according to aspects of the disclosed subject matter the user may engage in one or more use sessions. Each use session may include a training session and/or one or more rounds of gameplay. Each gameplay may include one or more trials, where each trial is represented, for example, by a beach. As illustrated above, for example, each gameplay consists of three trials. For each use session involving a gameplay, performance data for the user for each gameplay and each use session is stored. Performance data may be compared from one or more use sessions, gameplays, or trials within a gameplay to determine a difficulty level of a future trial or gameplay. The difficulty level may be determined real-time at the completion of a session, a round of gameplay, or at the commencement of a session or a round of gameplay.

The systems and methods according to aspects of the disclosed subject matter may utilize a variety of computer and computing systems, communications devices, networks and/or digital/logic devices for operation. Each may, in turn, be configurable to utilize a suitable computing device which can be manufactured with, loaded with and/or fetch from some storage device, and then execute, instructions that cause the computing device to perform a method according to aspects of the disclosed subject matter.

A computing device can include without limitation a mobile user device such as a mobile phone, a smart phone and a cellular phone, a personal digital assistant ("PDA"), such as a BlackBerry®, iPhone®, a tablet, a laptop and the like. In at least some configurations, a user can execute a browser application over a network, such as the Internet, to view and interact with digital content, such as screen displays. A display includes, for example, an interface that allows a visual presentation of data from a computing device. Access could be over or partially over other forms of computing and/or communications networks. A user may access a web-browser, e.g., to provide access to applications and data and other content located on a web-site or a web-page of a web-site.

A suitable computing device may include a processor to perform logic and other computing operations, e.g., a stand-alone computer processing unit ("CPU"), or hard wired logic as in a microcontroller, or a combination of both, and may execute instructions according to its operating system and the instructions to perform the steps of the method, or elements of the process. The user's computing device may be part of a network of computing devices and the methods of the disclosed subject matter may be performed by different computing devices associated with the network, perhaps in different physical locations, cooperating or otherwise interacting to perform a disclosed method. For example, a user's portable computing device may run an app alone or in conjunction with a remote computing device, such as a server on the Internet. For purposes of the present application, the term "computing device" includes any and all of the above discussed logic circuitry, communications devices and digital processing capabilities or combinations of these.

Certain embodiments of the disclosed subject matter may be described for illustrative purposes as steps of a method which may be executed on a computing device executing software, and illustrated, by way of example only, as a block diagram of a process flow. Such may also be considered as a software flow chart. Such block diagrams and like operational illustrations of a method performed or the operation of a computing device and any combination of blocks in a block diagram, can illustrate, as examples, software program code/instructions that can be provided to the computing device or at least abbreviated statements of the functionalities and operations performed by the computing device in executing the instructions. Some possible alternate implementation may involve the function, functionalities and operations noted in the blocks of a block diagram occurring out of the order noted in the block diagram, including occurring simultaneously or nearly so, or in another order or not occurring at all. Aspects of the disclosed subject matter may be implemented in parallel or seriatim in hardware, firmware, software or any combination(s) of these, co-located or remotely located, at least in part, from each other, e.g., in arrays or networks of computing devices, over interconnected networks, including the Internet, and the like.

The instructions may be stored on a suitable "machine readable medium" within a computing device or in communication with or otherwise accessible to the computing device. As used in the present application a machine readable medium is a tangible storage device and the instructions are stored in a non-transitory way. At the same time, during operation, the instructions may at some times be transitory, e.g., in transit from a remote storage device to a computing device over a communication link. However, when the machine readable medium is tangible and non-transitory, the instructions will be stored, for at least some period of time, in a memory storage device, such as a random access memory (RAM), read only memory (ROM), a magnetic or optical disc storage device, or the like, arrays and/or combinations of which may form a local cache memory, e.g., residing on a processor integrated circuit, a local main memory, e.g., housed within an enclosure for a processor of a computing device, a local electronic or disc hard drive, a remote storage location connected to a local server or a remote server access over a network, or the like. When so stored, the software will constitute a "machine readable medium," that is both tangible and stores the instructions in a non-transitory form. At a minimum, therefore, the machine readable medium storing instructions for execution on an associated computing device will be "tangible" and "non-transitory" at the time of execution of instructions by a processor of a computing device and when the instructions are being stored for subsequent access by a computing device.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A method of enhancing a cognitive ability of a user, comprising:
   conducting, via a user interface display of a user computing device, a gameplay session comprising:
      determining a complexity of the gameplay session from at least one of a number of orders in an order queue, a number of order components, an order of processing the orders in the order queue, a number of incomplete orders in a prior gameplay session, a training session performance;
      compiling, via the user computing device, an order processing device having one or more order processors with an order actuator to control each of the one or more order processors, the order queue, one or more order cards, one or more order components wherein each of the one or more order components has an order delivery time, and one or more order fulfillment containers;
      presenting, via the user interface display of the user computing device, the order processing device having one or more order processors with the order actuator to control the one or more order processors, the order queue, one or more order cards, one or more order components, and one or more order fulfillment containers;
      displaying, via the user interface display of the user computing device, the order processing device, one or more order processors, one or more order actuators, one or more order cards in the order queue, and one or more order components;
      selecting, via the user computing device, one or more order components for a first order fulfillment container;
      actuating, via the user computing device, an order commencement for the first order fulfillment container;
      actuating, via the user computing device, an order completion for the first order fulfillment container;
      selecting, via the user computing device, one or more order components for a second order fulfillment container;
      actuating, via the user computing device, an order commencement for the second order fulfillment container prior to the order completion of the first order fulfillment container;
      actuating, via the user computing device, a second order completion for the second order fulfillment container;
      enhancing a complexity of the gameplay session by having the user, via the user interface display of the user computing device, begin a plurality of orders, monitor a completion status of a plurality of orders, and select a termination time for a plurality of orders;
      determining whether a user input for an order received during the selecting and actuating steps has a correct number of order components corresponding to one or more order cards and whether the order completion occurred within an allotted order delivery time for the order components on the order card;
      increasing or decreasing, via the user computing device, a complexity of a subsequent gameplay session according to user performance during the gameplay session; and
      providing feedback to the user with respect to a completed order.

2. The method of claim 1 wherein the order processing device has a plurality of order actuators.

3. The method of claim 2 wherein the order actuator controls the order commencement and the order completion.

4. The method of claim 3 further comprising:
   recording, via the user computing device, whether the user successfully commences and completes an order in the order queue within the order delivery time.

5. The method of claim 1 wherein the order comprises a representation of one or more order components within an order sheet.

6. The method of claim 1 further comprising presenting the training session to the user prior to the gameplay session.

7. The method of claim 1 wherein the order processing device is an espresso machine and the order queue is a list of drink orders having one or more order components in each order.

8. The method of claim 7 wherein the order components are selected from espresso components and sweetener components.

9. An apparatus for enhancing a cognitive ability of a user, comprising:
   a user computing device configured to:
      conduct a gameplay session, utilizing a user interface display of the user computing device, comprising:
         determining a complexity of the gameplay session from at least one of a number of orders in an order queue, a number of order components, an order of processing the orders in the order queue, a number of incomplete orders in a prior gameplay session, a training session performance;
         compiling, via the user computing device, an order processing device having one or more order processors with an order actuator to control the one or more order processors, the order queue, one or more order cards, one or more order components, and one or more order fulfillment containers;
         presenting, via the user interface display of the user computing device, the order processing device having one or more order processors with the order actuator to control the one or more order processors, the order queue, one or more order cards, one or more order components, and one or more order fulfillment containers;
         displaying, via the user interface display of the user computing device, the order processing device, one or more order processors, one or more order actuators, one or more order cards in the order queue, and one or more order components;
         selecting, via the user computing device, one or more order components for a first order fulfillment container;
         actuating, via the user computing device, an order commencement for the first order fulfillment container;
         actuating, via the user computing device, an order completion for the first order fulfillment container;
         selecting, via the user computing device, one or more order components for a second order fulfillment container;
         actuating, via the user computing device, an order commencement for the second order fulfillment container prior to the order completion of the first order fulfillment container;
         actuating, via the user computing device, a second order completion for a second order fulfillment container;

enhancing a complexity of the gameplay session by having the user, via the user interface display of the user computing device, begin a plurality of orders, monitor a completion status of a plurality of orders, and select a termination time for a plurality of orders;

determining whether a user input for an order received during the selecting and actuating steps has a correct number of order components corresponding to one or more order cards and whether the order completion occurred within an allotted order time;

increasing or decreasing, via the user computing device, a complexity of a subsequent gameplay session according to user performance during the gameplay session; and providing feedback to a user with respect to a completed order.

10. The apparatus of claim 9 wherein the order processing device has a plurality of order actuators.

11. The apparatus of claim 10 wherein the order actuator controls the order commencement and the order completion.

12. The apparatus of claim 11 further comprising:
recording, via the user computing device, whether the user successfully commences and completes an order in the order queue within the order delivery time.

13. The apparatus of claim 9 wherein the order comprises a representation of one or more order components within an order sheet.

14. Non-transitory computer readable medium having stored thereon instructions executable by a processor, the instructions comprising instructions for:

conducting a gameplay session comprising:
determining a complexity of the gameplay session from at least one of a number of orders in an order queue, a number of order components, an order of processing the orders in the order queue, a number of incomplete orders in a prior gameplay session, a training session performance, a training session performance;

compiling, via the user computing device, an order processing device having one or more order processors with an order actuator to control the one or more order processors, the order queue, one or more order cards, one or more order components wherein each of the one or more order components has a delivery time, and one or more order fulfillment containers;

presenting, via the user interface display of the user computing device, the order processing device having one or more order processors with the order actuator to control the one or more order processors, the order queue, one or more order cards, one or more order components, and one or more order fulfillment containers;

displaying, via the user interface display of the user computing device, the order processing device, one or more order processors, one or more order actuators, one or more order cards in the order queue, and one or more order components;

selecting, via the user computing device, one or more order components for a first order fulfillment container;

actuating, via the user computing device, an order commencement for the first order fulfillment container;

actuating, via the user computing device, an order completion for the first order fulfillment container;

selecting, via the user computing device, one or more order components for a second order fulfillment container;

actuating, via the user computing device, an order commencement for the second order fulfillment container prior to the order completion of the first order fulfillment container;

actuating, via the user computing device, a second order completion for the second order fulfillment container;

enhancing a complexity of the gameplay session by having the user, via the user interface display of the user computing device, begin a plurality of orders, monitor a completion status of a plurality of orders, and select a termination time for a plurality of orders;

determining whether a user input for an order received during the selecting and actuating steps has a correct number of order components corresponding to one or more order cards and whether the order completion occurred within an allotted order time;

increasing or decreasing, via the user computing device, a complexity of a subsequent gameplay session according to user performance during the gameplay session; and providing feedback to a user with respect to the completed order.

15. The machine readable medium of claim 14 wherein the order processing device has a plurality of order actuators.

16. The machine readable medium of claim 15 wherein the order actuator controls the order commencement and the order completion.

17. The machine readable medium of claim 16 further comprising:
recording, via the user computing device, whether the user successfully commences and completes an order in the order queue within the order delivery time.

18. The machine readable medium of claim 14 wherein the order comprises a representation of one or more order components within an order sheet.

19. The machine readable medium of claim 17 further comprising:
enhancing a complexity of the gameplay session by presenting, via the user interface display of the user computing device, a plurality of orders concurrently, monitor a completion status of the plurality of orders, and select a termination time for the plurality of orders.

* * * * *